US012751343B2

(12) United States Patent
Schroeder

(10) Patent No.: US 12,751,343 B2
(45) Date of Patent: Oct. 6, 2026

(54) SYSTEM AND METHOD FOR REDUCING OR PREVENTING PLUGGING OF AN AGRICULTURAL IMPLEMENT

(71) Applicant: CNH Industrial America LLC, New Holland, PA (US)

(72) Inventor: Brittany Schroeder, Bunker Hill, IN (US)

(73) Assignee: CNH Industrial America LLC, New Holland, PA (US)

( * ) Notice: Subject to any disclaimer, the term of this patent is extended or adjusted under 35 U.S.C. 154(b) by 473 days.

(21) Appl. No.: 18/221,657

(22) Filed: Jul. 13, 2023

(65) Prior Publication Data

US 2025/0017122 A1 Jan. 16, 2025

(51) Int. Cl.
*A01B 21/08* (2006.01)
*A01B 23/06* (2006.01)

(52) U.S. Cl.
CPC ............ *A01B 21/086* (2013.01); *A01B 23/06* (2013.01)

(58) Field of Classification Search
CPC ....... A01B 21/08; A01B 21/086; A01B 23/06; A01B 5/00–16; A01B 7/00; A01B 15/16; A01B 33/00–16
See application file for complete search history.

(56) References Cited

U.S. PATENT DOCUMENTS 855,389 A 5/1907 Dawkins
2,588,561 A 3/1952 Opp et al.
9,405,039 B2 8/2016 Anderson
10,188,045 B1 1/2019 Flagler et al.
10,729,052 B1 * 8/2020 Lund ...................... A01C 5/062
10,925,208 B2 * 2/2021 Anderson .............. G01N 33/24
11,191,202 B2 12/2021 Henry
11,284,612 B2 3/2022 Fox et al.
11,369,052 B2 6/2022 Cozza et al.
11,497,154 B1 11/2022 Lund et al.
11,589,495 B2 * 2/2023 Glovier .................... A01B 5/04
(Continued)

FOREIGN PATENT DOCUMENTS

CN 107466574 A 12/2017
DE 758514 C 11/1953
(Continued)

OTHER PUBLICATIONS

Co-Pending U.S. Appl. No. 18/221,648, filed Jul. 13, 2023.

*Primary Examiner* — Matthew Troutman
(74) *Attorney, Agent, or Firm* — Dority & Manning, P.A.

(57) ABSTRACT

A system for reducing or preventing plugging of an agricultural implement includes a disk blade configured to rotate relative to soil within a field as the agricultural implement travels across the field. Furthermore, the system includes an electrode embedded within the disk blade. Additionally, the system includes a sensor configured to generate data indicative of a soil moisture content of a portion of the field and a computing system communicatively coupled to the sensor. As such, the computing system is configured to determine the soil moisture content of the field based on the data generated by the sensor. Moreover, the computing system is configured to control a flow of electricity at least one of to or from the electrode based on the determined soil moisture content such that an electric field is induced on at least a portion of a surface of the disk blade.

17 Claims, 7 Drawing Sheets

(56) References Cited

U.S. PATENT DOCUMENTS

| | | | | |
|---|---|---|---|---|
| 12,379,363 | B2 * | 8/2025 | Stoller | A01B 47/00 |
| 12,419,209 | B2 * | 9/2025 | Schroeder | A01B 47/00 |
| 2021/0045281 | A1 | 2/2021 | Glovier | |

FOREIGN PATENT DOCUMENTS

| | | | | |
|---|---|---|---|---|
| DE | 102008026159 | A1 | 12/2009 | |
| RU | 2421955 | C1 | 6/2011 | |
| SU | 1250177 | A1 | 8/1986 | |
| WO | WO-2021021508 | A1 * | 2/2021 | G01N 33/246 |
| WO | WO-2021030320 | A1 * | 2/2021 | A01B 71/08 |

* cited by examiner

SYSTEM AND METHOD FOR REDUCING OR PREVENTING PLUGGING OF AN AGRICULTURAL IMPLEMENT

FIELD OF THE INVENTION

The present disclosure generally relates to agricultural implements and, more particularly, to systems and methods for reducing or preventing plugging of an agricultural implement.

BACKGROUND OF THE INVENTION

It is well known that, to attain the best agricultural performance from a field, a farmer must cultivate the soil, typically through a tillage operation. Modern farmers perform tillage operations by pulling an agricultural implement behind an agricultural work vehicle, such as a tractor. In certain configurations, agricultural implements include one or more disk gangs supported on its frame. Each disk gang, in turn, includes a plurality of spaced apart disk blades that are configured to rotate relative to the soil as the agricultural implement travels across the field. The rotation of the disks loosens and/or otherwise agitates the soil to prepare the field for subsequent planting operations.

During tillage operations, field materials, such as residue, soil, rocks, and/or the like, may become trapped or otherwise accumulate between adjacent pairs of disks. When such accumulations of field materials become sufficient to prevent a disk blade from providing adequate tillage to the field (e.g., by slowing or preventing rotation of such disk blade), the disk blade is plugged. In such instances, it is necessary for the operator to take certain corrective actions to remove the accumulated field materials. However, such corrective actions can be time-consuming. In this respect, systems have been developed to prevent or reduce plugging of disk blades during tillage or other agricultural operations. While such systems work well, further improvements are needed.

Accordingly, an improved system and method for reducing or preventing plugging of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural implement. The agricultural implement, in turn, includes a frame and a disk blade supported on the frame, with the disk blade configured to rotate relative to soil within a field as the agricultural implement travels across the field. Furthermore, the agricultural implement includes an electrode embedded within the disk blade. Additionally, the agricultural implement includes a sensor configured to generate data indicative of a soil moisture content of a portion of the field and a computing system communicatively coupled to the sensor. In this respect, the computing system is configured to determine the soil moisture content of the field based on the data generated by the sensor. Moreover, the computing system is configured to control a flow of electricity at least one of to or from the electrode based on the determined soil moisture content such that an electric field is induced on at least a portion of a surface of the disk blade.

In another aspect, the present subject matter is directed to a system for reducing or preventing plugging of an agricultural implement. The system includes a disk blade configured to rotate relative to soil within a field as the agricultural implement travels across the field. In addition, the system includes an electrode embedded within the disk blade. Furthermore, the system includes a sensor configured to generate data indicative of a soil moisture content of a portion of the field and a computing system communicatively coupled to the sensor. As such, the computing system is configured to determine the soil moisture content of the field based on the data generated by the sensor. Additionally, the computing system is configured to control a flow of electricity at least one of to or from the electrode based on the determined soil moisture content such that an electric field is induced on at least a portion of a surface of the disk blade.

In a further aspect, the present subject matter is directed to a method for reducing or preventing plugging of an agricultural implement. The agricultural implement, in turn, includes a disk blade configured to rotate relative to soil within a field as the agricultural implement travels across the field. Moreover, the agricultural implement further includes an electrode embedded within the disk blade. The method includes receiving, with a computing system, sensor data indicative of a soil moisture content of a portion of the field. In addition, the method includes determining, with the computing system, the soil moisture content of the field based on the received sensor data. Furthermore, the method includes controlling, with the computing system, a flow of electricity at least one of to or from the electrode based on the determined soil moisture content such that an electric field is induced on at least a portion of a surface of the disk blade.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
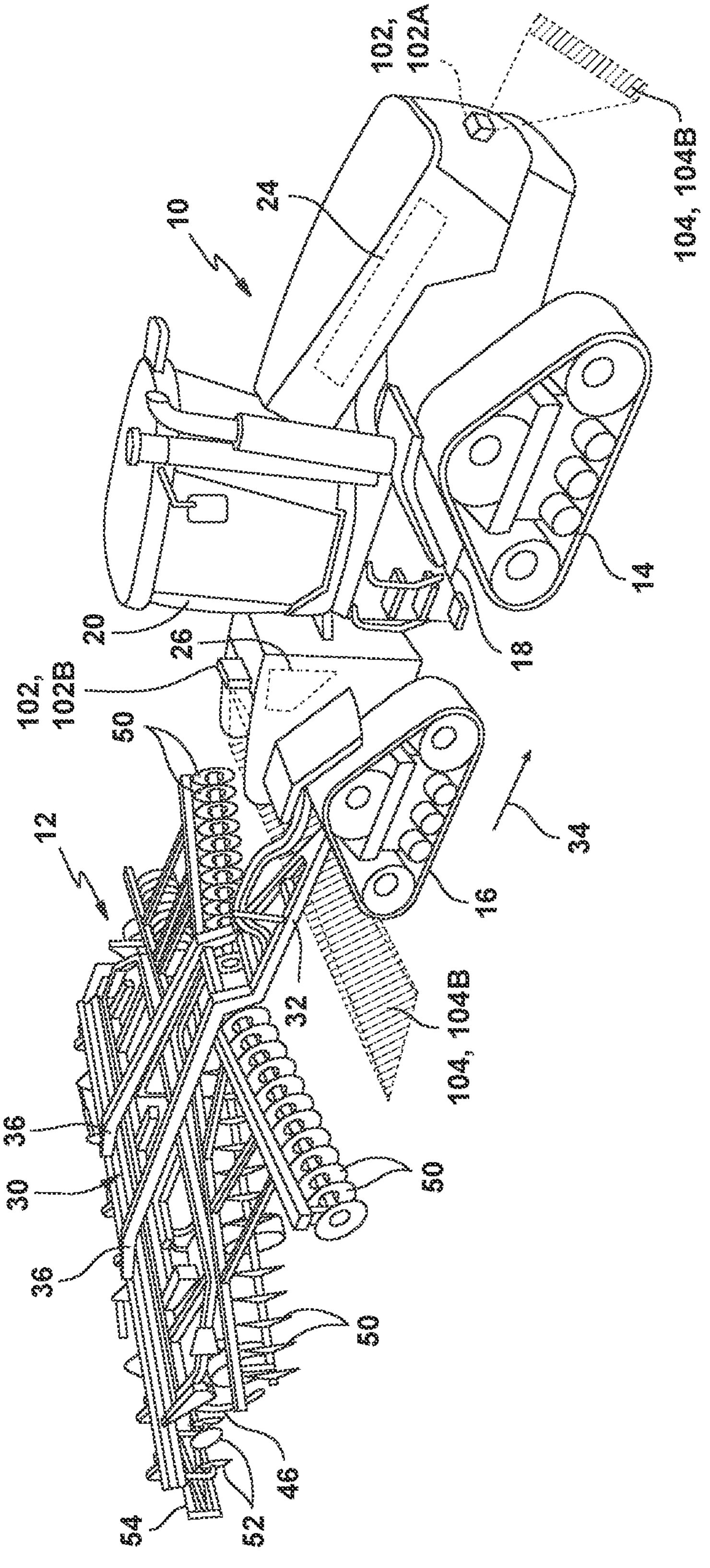
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to a system and a method for reducing or preventing plugging of an agricultural implement. As will be described below, the agricultural implement includes one or more disk blades configured to rotate relative to the soil within a field as the agricultural implement travels across the field (e.g., to perform an agricultural operation thereon). Furthermore, the agricultural implement includes one or more electrodes embedded within the disk blade(s).

Additionally, a computing system of the disclosed system is configured to control the flow of electricity to and/or from the electrode(s) such that an electric field(s) is induced on the outer surface(s) of the disk blade(s). Specifically, in several embodiments, the computing system is configured to receive sensor data indicative of a soil moisture content of a portion(s) of the field (e.g., that is forward of the disk blade(s)). Moreover, the computing system is configured to determine the soil moisture content of the field based on the received sensor data. Thereafter, the computing system is configured to control one or more flow control devices (e.g., one or more transistors, relays, switches, rheostats, power converters, etc.) to control the flow of electricity to and/or from the electrode(s) based on the determined soil moisture content. This, in turn, induces an electric field(s) on at least a portion(s) of the surface(s) of the disk blade(s). For example, in some embodiments, the computing system may determine the strength of the electric field(s) to be induced based on the soil moisture content. Thereafter, the computing system may control the flow of electricity such that the electric field(s) induced on the disk blade(s) has the determined strength.

The disclosed system and method improve the operation of the agricultural implement. More specifically, water present within the soil increases the adhesional forces between the soil and the disk blade(s) of the agricultural implement, thereby causing the soil to adhere to the disk blade(s) and potentially lead to plugging. In this respect, as the moisture content of the soil increases, the adhesional forces between the soil and the disk blade(s) similarly increase. As described above, the disclosed system and method induce an electric field(s) on the surface(s) of the disk blade(s). Moreover, by using the soil moisture content, the strength of the electric field(s) induced on the disk blade(s) can be adjusted to ensure that electroosmosis is occurring on the disk blade(s). Electroosmosis, in turn, reduces the adhesional forces between the soil and the disk blade(s) and, thus, the potential that soil will adhere to the disk blade(s) and cause plugging.

Figure 2:
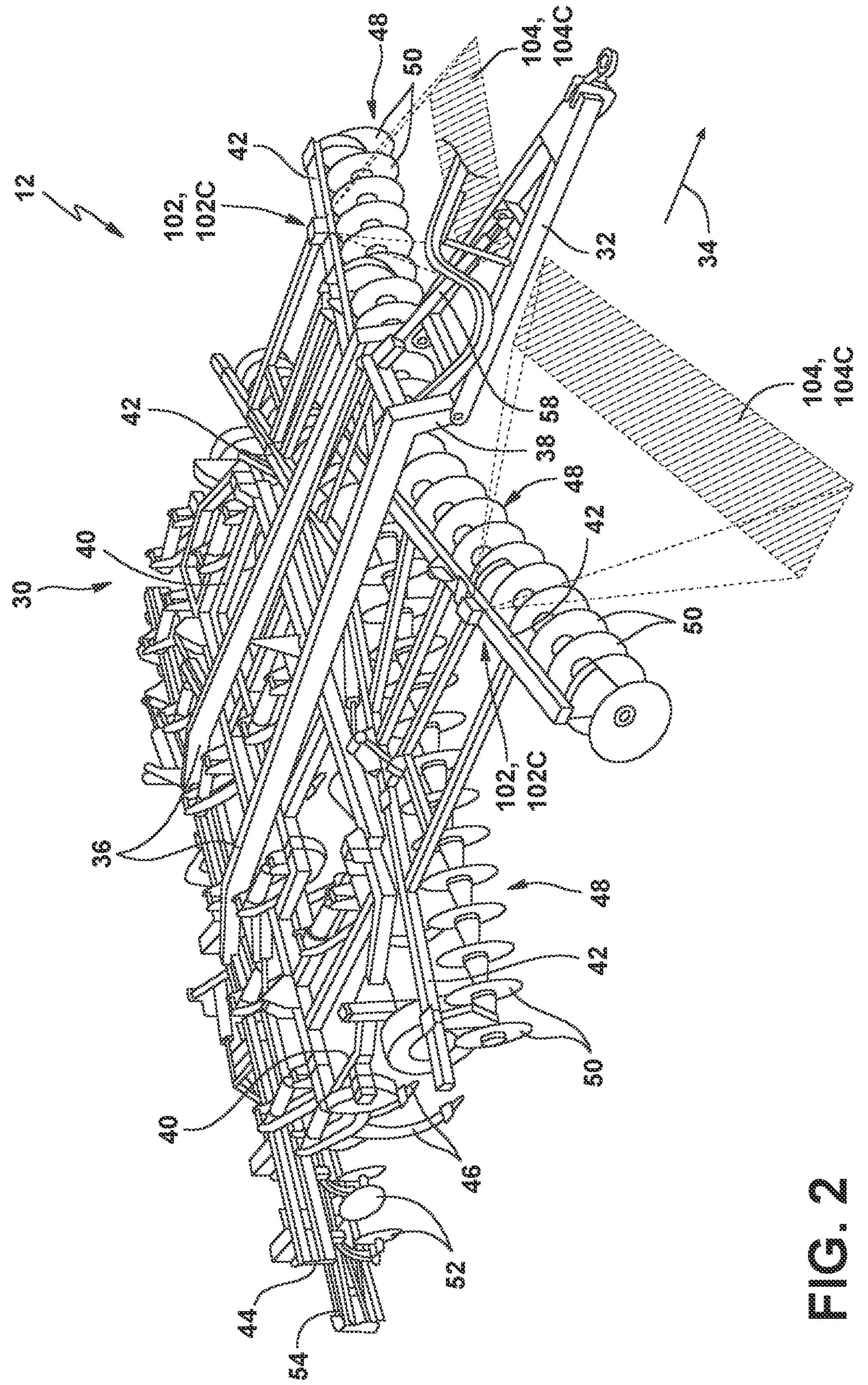
FIG. 2 illustrates another perspective view of the agricultural implement shown in FIG. 1, particularly illustrating various ground-engaging tools of the implement.

Referring now to drawings, FIGS. 1 and 2 illustrate perspective views of one embodiment of a work vehicle 10 and an associated agricultural implement 12. Specifically, FIG. 1 illustrates a perspective view of the work vehicle 10 towing the agricultural implement 12 (e.g., across a field). Additionally, FIG. 2 illustrates a perspective view of the agricultural implement 12 shown in FIG. 1.

As shown, in the illustrated embodiment, the work vehicle 10 is configured as an agricultural tractor and the agricultural implement 12 is configured as a tillage implement (e.g., a disk ripper). However, in other embodiments, the work vehicle 10 may be configured as any other suitable vehicle configured to tow an agricultural implement. Similarly, the agricultural implement 12 may be configured as any other suitable type of implement, such as another type of tillage implement, a seed-planting implement, a fertilizing implement, and/or the like.

As particularly shown in FIG. 1, the work vehicle 10 includes a pair of front track assemblies 14, a pair of rear track assemblies 16, and a frame or chassis 18 coupled to and supported by the track assemblies 14, 16. An operator's cab 20 may be supported by a portion of the chassis 18 and may house various input devices for permitting an operator to control the operation of one or more components of the work vehicle 10 and/or one or more components of the agricultural implement 12. Additionally, the work vehicle 10 may include an engine 24 and a transmission 26 mounted on the chassis 18. The transmission 26 may be operably coupled to the engine 24 and may provide variably adjusted gear ratios for transferring engine power to the track assemblies 14, 16 via a drive axle assembly (not shown) (or via axles if multiple drive axles are employed). Furthermore, the work vehicle 10 can have any other suitable traction device(s), such as wheels or tires, and/or any other suitable transmission/engine configuration.

Moreover, as shown in FIGS. 1 and 2, the agricultural implement 12 includes a carriage frame assembly 30 configured to be towed by the work vehicle 10 via a pull hitch or tow bar 32 in a direction of travel of the vehicle (e.g., as indicated by arrow 34). In this respect, the carriage frame assembly 30 may be configured to support a plurality of ground-engaging tools, such as a plurality of shanks, disk blades, leveling blades, basket assemblies, and/or the like. As such, the various ground-engaging tools may be configured to perform an agricultural operation (e.g., a tillage operation) on the field across which the agricultural implement 12 is being towed.

As particularly shown in FIG. 2, the carriage frame assembly 30 may include aft extending carrier frame members 36 coupled to the tow bar 32. In addition, reinforcing gusset plates 38 may be used to strengthen the connection between the tow bar 32 and the carrier frame members 36. In several embodiments, the carriage frame assembly 30 may support a central frame 40, a forward frame 42 positioned forward of the central frame 40 relative to the direction of travel 34 of the work vehicle 10, and an aft frame 44 positioned aft of the central frame 40 relative to the direction of travel 34 of the work vehicle 10. As shown in FIG. 2, in one embodiment, the central frame 40 may correspond to a shank frame configured to support a plurality of ground-engaging shanks 46. In such an embodiment, the shanks 46 may be configured to till the soil as the agricultural implement 12 is towed across the field. However, in other embodiments, the central frame 40 may be configured to support any other suitable ground-engaging tools.

Additionally, as shown in FIG. 2, in one embodiment, the forward frame 42 may correspond to a disk frame configured to support various gangs or sets 48 of disk blades 50. In such an embodiment, each disk blade 50 may, for example, include both a concave side (not shown) and a convex side (not shown). In addition, the various gangs 48 of disk blades 50 may be oriented at an angle relative to the travel direction 34 of the work vehicle 10 to promote more effective tilling of the soil. However, in other embodiments, the forward frame 42 may be configured to support any other suitable ground-engaging tools.

Moreover, like the central and forward frames 40, 42, the aft frame 44 may also be configured to support a plurality of ground-engaging tools. For instance, in the illustrated embodiment, the aft frame is configured to support a plurality of leveling blades 52 and rolling (or crumbler) basket assemblies 54. However, in other embodiments, any other suitable ground-engaging tools may be coupled to and supported by the aft frame 44, such as a plurality of closing disks.

Additionally, as shown in FIGS. 1 and 2, the work vehicle 10 and/or the agricultural implement 12 may include one or more sensors 102 coupled thereto and/or supported thereon. In general, the sensor(s) 102 is configured to generate data indicative of the soil moisture content of the field across which the vehicle/implement 10/12 are traveling. Specifically, in several embodiments, the sensor(s) 102 may be provided in operative association with the work vehicle 10 such that the sensor(s) 102 has a field(s) of view 104 directed towards a portion(s) of the field disposed in front of, behind, and/or along one or both of the sides of the work vehicle 10. Additionally, or alternatively, the sensor(s) 102 may be provided in operative association with the agricultural implement 12 such that the sensor(s) has a field(s) of view 104 directed towards a portion(s) of the field disposed in front of the agricultural implement 12 as the agricultural implement 12 is being towed across the field. As such, the sensor(s) 102 may generate soil moisture data associated with one or more portion(s) of the field in front of the agricultural implement 12 (and, more specifically, the disk blades 50 of the agricultural implement 12) as the vehicle/implement 10/12 travels across the field.

In general, the sensor(s) 102 may correspond to any suitable device(s) configured to generate data indicative of the soil moisture content of the field. For example, in several embodiments, the sensor(s) 102 may be configured as an optical sensor(s) configured to detect one or more characteristics of the light reflected by the soil, with such characteristics generally being indicative of the soil moisture content. However, in alternative embodiments, the sensor(s) 102 may be configured as any other suitable device(s) for sensing or detecting the soil moisture content of the field, such as a ground-penetrating radar sensor(s), an electromagnetic inductance (EMI) sensor(s), etc.

The work vehicle 10 and/or the agricultural implement 12 may include any number of sensor(s) 102 provided at any suitable location(s) that allows soil moisture data to be generated as the work vehicle 10 and the agricultural implement 12 traverse the field. In this respect, FIGS. 1 and 2 illustrate example locations for mounting the sensor(s) 102 for generating soil moisture data for the portion of the field forward of the agricultural implement 12 relative to the direction of travel 34.

For example, as shown in FIG. 1, in one embodiment, one or more sensors 102A may be coupled to the front of the work vehicle 10 such that the sensor(s) 102A has a field(s) of view 104A that allows for the generation of data indicative of the soil moisture content of an adjacent area or portion of the field disposed in front of the work vehicle 10 and, thus, in front of the agricultural implement 12. For instance, the field(s) of view 104A of the sensor(s) 102A may be directed outwardly from the front of the work vehicle 10 along a plane or reference line that extends generally parallel to the travel direction 34 of the work vehicle 10. In addition to the sensor(s) 102A (or as an alternative thereto), one or more sensors 102B may be coupled to the rear of the work vehicle 10 such that the sensor(s) 102B has a field(s) of view 104B that allows for the generation of data indicative of the soil moisture content of an adjacent area or portion of the field disposed aft of the work vehicle 10 and forward of the agricultural implement 12. For instance, the field(s) of view 104B of the sensor(s) 102B may be directed outwardly from the rear of the work vehicle 10 along a plane or reference line that extends generally parallel to the travel direction 34 of the work vehicle 10.

In addition to the sensor(s) 102A, 102B (or as an alternative thereto), one or more sensors 102C may also be coupled to the front of the agricultural implement 12 such that the sensor(s) 102C has a field(s) of view 104C that allows for the generation of data indicative of the soil moisture content of an adjacent area or portion of the field disposed in front of the agricultural implement 12. For instance, the field(s) of view 104C of the sensor(s) 102C may be directed outwardly from the front of the agricultural implement 12 along a plane or reference line that extends generally perpendicular to the travel direction 34 of the work vehicle 10.

However, in alternative embodiments, the sensor(s) 102 may be installed at any other suitable location(s) that allows the device(s) to generate data indicative of the soil moisture content of a portion(s) of the field forward of the agricultural implement 12 (e.g., forward of the disk blades 50 of the agricultural implement 12).

Figure 3:
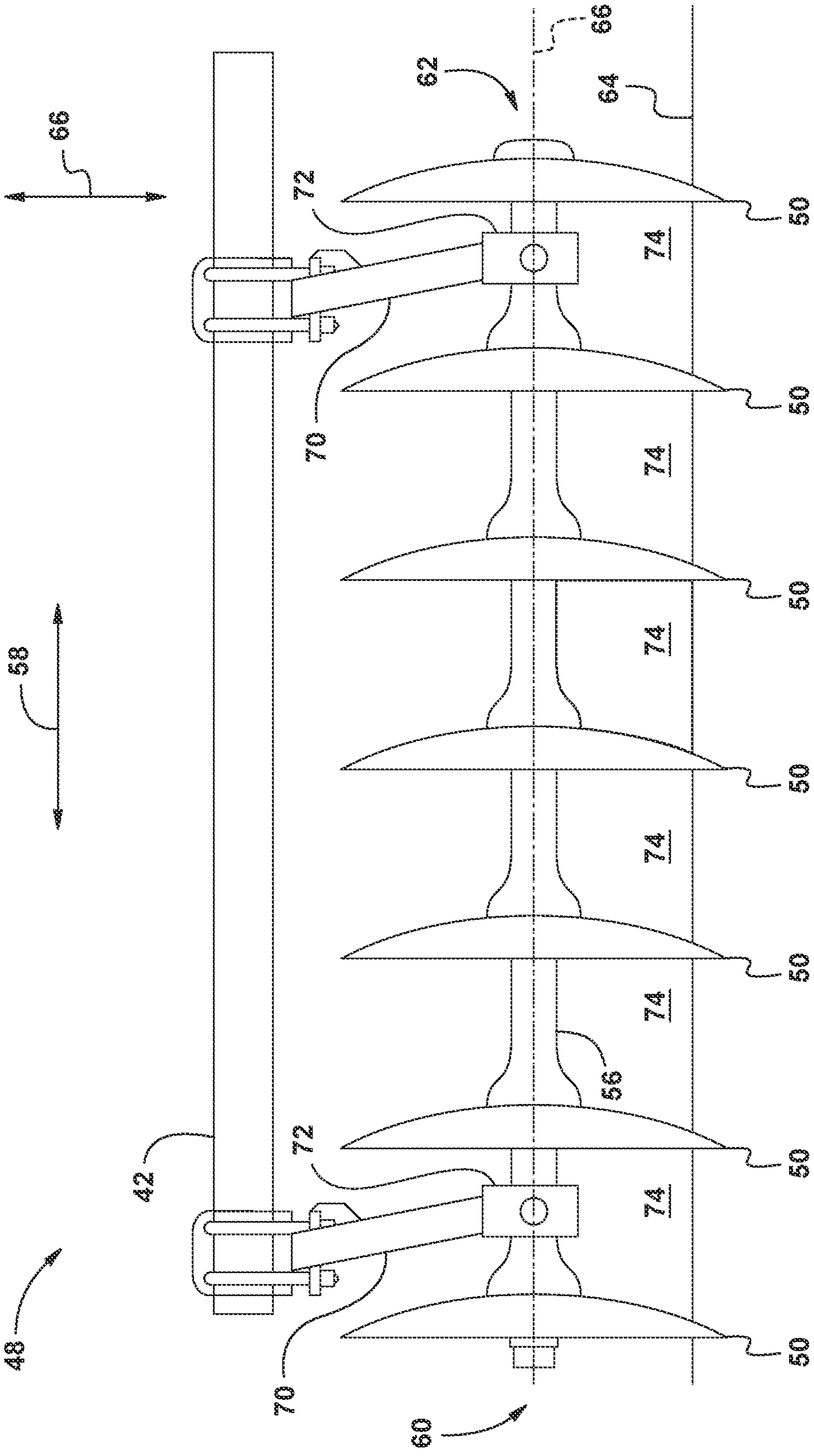
FIG. 3 illustrates a front view of one embodiment of a disk gang of an agricultural implement in accordance with aspects of the present subject matter.

Referring now to FIG. 3, a front view of one embodiment of a disk gang 48 of the agricultural implement 12 is illustrated in accordance with aspects of the present subject matter. Specifically, in several embodiments, the disk gang 48 may include a disk gang shaft 56 that extends along an axial direction or length of the disk gang 48 (e.g., as indicated by arrow 58 in FIG. 3) between a first end 60 and a second end 62. As shown, the disks 50 are coupled to the disk gang shaft 56 and spaced apart from each other along the axial direction 58. As the agricultural implement 12 is moved across a field, the disks 50 may be configured to penetrate the soil surface (e.g., as indicated by line 64 in FIG. 3) of the field and rotate about an axis of rotation (e.g., as indicated by dashed line 66 in FIG. 3) relative to the soil within the field.

In general, the disk gang 48 is supported relative to the forward frame 42 of the agricultural implement 12. Specifically, in several embodiments, a pair of hangers 70 (e.g., C-hangers) support the disk gang 48 at a position below the forward frame 42. For example, in one embodiment, one end of each hanger 70 may be coupled to the forward frame 42, while the opposing end of each hanger 70 is coupled to a bearing block 72. The bearing blocks 72, in turn, are rotatably coupled to the disk gang shaft 56. However, in alternative embodiments, the disk gang 48 may have any other suitable configuration.

As shown in FIG. 3, the disk gang 48 defines a plurality of more flow zones 74 through which field materials may flow during the operation of the agricultural implement 12. Specifically, in several embodiments, each flow zone 74 may be defined directly between a pair of adjacent disks 50 in the axial direction 58. In this respect, as the agricultural implement 12 travels across the field, field materials (e.g., soil, residue, rocks, and/or the like) may flow through the flow zone 74 as such field materials are being tilled or otherwise processed by the disks 50. During normal, non-plugged operation of the disk gang 48, substantially all of the field materials being processed by the disk gang 48 flow through the flow zones 74, with only minimal field materials like becoming trapped or otherwise accumulating within the flow zones 74. However, the adhesional forces between the soil and the disk blades 50 caused by the soil moisture content of the soil may result in the adherence of soil to the outer surfaces of the disk blades 50. Such adhered soil may, in turn, cause field materials to accumulate within the flow zones 74. In this respect, when a sufficient amount of field materials accumulates within one or more of the flow zones 74 such that rotation of the disks 50 is impacted (e.g., the rotational speed of the disks 50 is reduced or the disks 50 stop rotating), the disk gang 48 is considered plugged.

The configuration of the work vehicle 10 and the agricultural implement 12 described above and shown in FIGS. 1-3 is provided only to place the present subject matter in an exemplary field of use. Thus, the present subject matter may be readily adaptable to any manner of vehicle and/or implement configuration.

Figure 4:
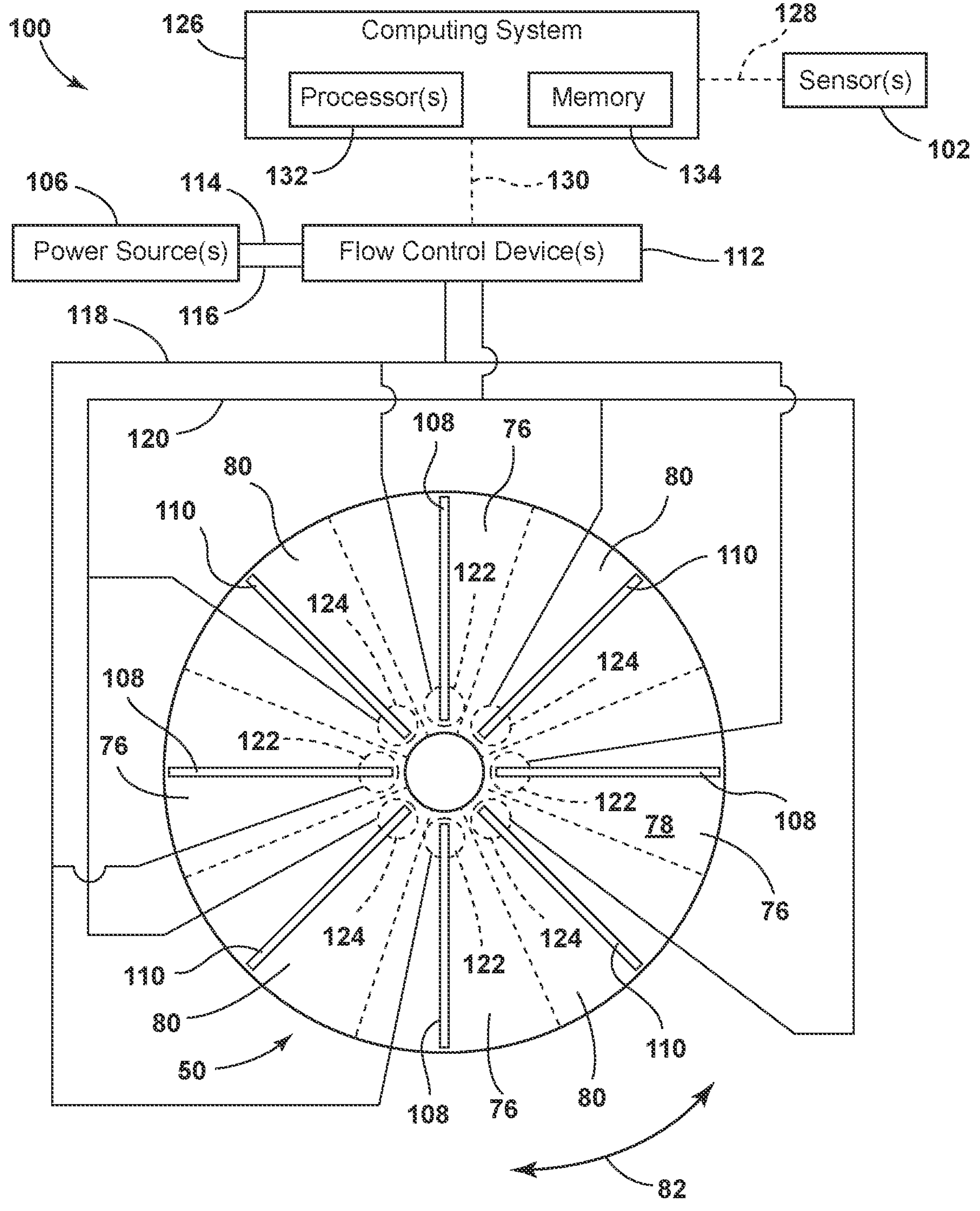
FIG. 4 illustrates a schematic view of one embodiment of a system for reducing or preventing plugging of an agricultural implement in accordance with aspects of the present subject matter.

Referring now to FIG. 4, a schematic view of one embodiment of a system 100 for reducing or preventing plugging of an agricultural implement is illustrated in accordance with aspects of the present subject matter. In general, the system 100 will be described herein with reference to the work vehicle 10 and the agricultural implement 12 described above with reference to FIGS. 1-3. However, it should be appreciated by those of ordinary skill in the art that the disclosed system 100 may generally be utilized with work vehicles having any other suitable vehicle configuration and/or with agricultural implements having any other suitable implement configuration.

As shown in FIG. 4, the system 100 includes one or more power sources 106. In general, the power source(s) 106 is configured to generate electric current, which is, in turn, used to induce an electric field(s) on a portion(s) of one or more of the disk blades 50 of the agricultural implement 12. As such, the power source(s) 106 may correspond to one or more batteries, alternators, generators, and/or the like.

Furthermore, in several embodiments, the system 100 includes one or more first electrodes 108 and one or more second electrodes 110 embedded within the disk blade(s) 50. In general, each first electrode 108 is configured to operate as one of an anode or a cathode, while each second electrode 110 is configured to operate as the other of the anode or cathode. In this respect, one of a positive or negative electric field is induced on a portion(s) 76 of an outer surface(s) 78 of the disk blade(s) 50 adjacent to the first electrode(s) 108. Conversely, the other of the positive or negative electric field is induced on a portion(s) 80 of the outer surface(s) 78 of the disk blade(s) 50 adjacent to the second electrode(s) 110. As will be described below, in several embodiments, the polarities of the electric fields being induced on the outer surface(s) 78 of the disk blade(s) 50 is alternated. For example, during a given period of time, the first electrode(s) 108 operates as an anode(s) such a positive electric field(s) is induced on the portion(s) 76 of the outer surface(s) 78 of the disk blade(s) 50 adjacent thereto. Simultaneously, during the given period of time, the second electrode(s) 110 operates as a cathode(s) such a negative electric field(s) is induced on the portion(s) 80 of the outer surface(s) 78 of the disk blade(s) 50 adjacent thereto. Thereafter, during a subsequent period of time, the first electrode(s) 108 operates as a cathode(s) such a negative electric field(s) is induced on the portion(s) 76 of the outer surface(s) 78 of the disk blade(s) 50 adjacent thereto. Simultaneously, during the subsequent period of time, the second electrode(s) 110 operates as an anode(s) such a positive electric field(s) is induced on the portion(s) 80 of the outer surface(s) 78 of the disk blade(s) 50 adjacent thereto. This alternating pattern is repeated as the disk blade(s) 50 rolls relative to the soil within the field. Such alternating electric fields, in turn, cause electroosmosis to occur on the outer surface(s) 78 of the disk blade(s) 50, which reduces the adhesional forces between the soil and the disk blade(s) 50 and, thus, the likelihood of plugging.

Each disk blade 50 may include any suitable number of first electrodes 108 and/or any suitable number of second electrodes 110. For example, as shown in FIG. 4, the illustrated disk blade 50 includes four first electrodes 108 spaced apart from each other along a circumferential direction (e.g., as indicated by arrow 82) of the disk blade 50. In such an embodiment, the first electrodes 108 may generally be spaced equidistant from each other in the circumferential direction 82. Additionally, as shown in FIG. 4, the illustrated disk blade 50 includes four second electrodes 110 spaced apart from each other along the circumferential direction 82 of the disk blade 50. In such an embodiment, the second electrodes 110 may generally be spaced equidistant from each other in the circumferential direction 82. Moreover, the first and second electrodes 108, 110 are interdigitated such that such a first electrode 108 is positioned between each pair of adjacent second electrodes 110 and a second electrode 110 is positioned between each pair of adjacent first electrodes 108. However, in alternative embodiments, the disk blade(s) 50 may include more or less first electrodes 108 and/or more or less second electrodes 110.

Moreover, the first and second electrodes 108, 110 may have any suitable construction and/or be embedded in the disk blade(s) 50 in any suitable manner. For example, as shown in FIG. 4, the first and second electrodes 108, 110 are configured as slender, rod-like metallic components that extend radially outward from the center of the illustrated disk blade 50. Furthermore, in the illustrated embodiment, the first and second electrodes 108, 110 are of similar construction. However, in alternative embodiments, the first and second electrodes 108, 110 may be of any other suitable construction and/or be embedded in the disk blade(s) 50 in any other suitable manner.

In addition, the system 100 includes one or more flow control devices 112. In general, the flow control device(s) 112 is configured to control the flow of electric current between the power source(s) 106 and the first and second electrodes 108, 110. In this respect, the flow control device(s) 112 may be configured as any suitable device(s) configured to control the flow of electric current, such as one or more switches, one or more relays, one or more transistors, one or more power converters, one or more rheostats, and/or the like. As will be described below, by controlling the operation of the flow control device(s) 112, the flow of electricity to the disk blade(s) 50 can be adjusted, thereby allowing the magnitudes of the electric fields induced on the disk blade(s) 50 to be controlled.

Furthermore, the system 100 may include one or more electric wires or cables to facilitate the flow of electric current between the power source(s) 106 and the first and second electrodes 108, 110. For example, in the illustrated embodiment, electric wires 114, 116 may electrically couple the power source(s) 106 and the flow control device(s) 112. Additionally, an electric wire(s) 118 may electrically couple the flow control device(s) 112 to one of the first electrodes 108 or the second electrodes 110. Similarly, an electric wire(s) 120 may electrically couple the flow control device(s) 112 to the other of the first electrodes 108 or the second electrodes 110. In one embodiment, the electric wires 118, 120 may be routed along one or more of the hangers 70 and/or through the disk gang shaft 56.

Moreover, in several embodiments, the electric wire(s) 118 may terminate at one or more first contacts 122, and the electric wire(s) 120 may terminate at one or more second contacts 124. More specifically, in such embodiments, the first and second contacts 122, 124 may be fixed relative to the disk gang shaft(s) 56. As such, the first contact(s) 122 may slidingly engage and then disengage one of the first electrode(s) 108 or the second electrode(s) 110, while the second contact(s) 124 may simultaneously slidingly engage and then disengage the other of the first electrode(s) 108 or the second electrode(s) 110. Thus, the first and second contacts 122, 124 generally complete the electrical connection between the power source(s) 106 and the first and second electrodes 108, 110 embedded in the rotating disk blade(s) 50.

The system 100 may include any suitable number of first contacts 122 and/or any suitable number of second contacts 110. For example, in the illustrated embodiment, the system 100 includes the same number of first contacts 122 as there are first or second electrodes 108, 110 and the same number of second contacts 124 as there are first or second electrodes 108, 110. That, in the illustrated embodiment, there are four first contacts 122 and four second contacts 124 mounted relative to each disk blade 50. However, in alternative embodiments, the system 100 may include other any suitable number of first contacts 122 and/or any suitable number of second contacts 110.

In embodiments in which there are a plurality of first contacts 122 and a plurality of second contacts 124, the first and second contacts 122, 124 may be arranged in an alternating manner. For example, the first contacts 122 may be positioned between each pair of adjacent second contacts 124. Similarly, the second contacts 124 is positioned between each pair of adjacent first contacts 122. As will be described below, such an arrangement of first and second contacts 122, 124 facilitates the inducement of alternating positive and negative electric fields on the outer surface(s) 78 of the disk blade(s) 50.

The rotation of the disk blade(s) 50 allows for the inducement of such alternating positive and negative electric fields. More specifically, as the agricultural implement 12 travels across the field, each disk blade 50 rotates relative to the corresponding disk gang shaft 56 and the soil within the field. In this respect, during a given period of time, the first contact(s) 122 slidingly engages the first electrode(s) 108 and the second contact(s) 124 slidingly engages the second electrode(s) 110. During such a period of time, the first electrode(s) 108 may act as an anode(s) and the second electrode(s) 110 may act as a cathode(s). In such instances, the power source(s) 106 may cause electric current to flow from first electrode(s) 108 to the second electrode(s) 110, thereby inducing a positive electric field in the portion(s) 76 of the outer surface(s) 78 of the disk blade(s) 50 adjacent to the first electrode(s) 108 and a negative electric field in the portion(s) 80 of the outer surface(s) 78 of the disk blade(s) 50 adjacent to the second electrode(s) 110. During a subsequent period of time, the disk blade(s) 50 rotates such that the first contact(s) 122 slidingly engages the second electrode(s) 110 and the second contact(s) 124 slidingly engages the first electrode(s) 108. Moreover, during such a period of time, the first electrode(s) 108 may act as a cathode(s) and the second electrode(s) 110 may act as an anode(s). In such instances, the power source(s) 106 may cause electric current to flow from second electrode(s) 110 to the first electrode(s) 108, thereby inducing a positive electric field in the portion(s) 80 of the outer surface(s) 78 of the disk blade(s) 50 adjacent to the second electrode(s) 110 and a negative electric field in the portion(s) 76 of the outer surface(s) 78 of the disk blade(s) 50 adjacent to the first electrode(s) 108. During another subsequent period of time, the disk blade(s) 50 rotates such that the first contact(s) 122 slidingly engages the first electrode(s) 108 and the second contact(s) 124 slidingly engages the second electrode(s) 110 again and so on.

As mentioned above, the alternating positive and negative electric fields induced on the outer surface(s) 78 of the disk blade(s) 50 prevent or reduce plugging of the disk blade(s) 50. More specifically, water generally adheres to the portion(s) of the outer surface(s) 78 of the disk blade(s) 50 that are negatively charged and slides off of portion(s) of the outer surface(s) 78 of the disk blade(s) 50 that are positively charged. Such alternating adherence and a shedding of water on each portion 76, 80 of the outer surface(s) 78 of the disk blade(s) 50 prevents soil from adhering to the disk blade(s) 50, thereby reducing or preventing the accumulation of field materials within flow zones 74 that lead to plugging.

Moreover, the system 100 includes a computing system 126 communicatively coupled to one or more components of the work vehicle 10, the agricultural implement 12, and/or the system 100 to allow the operation of such components to be electronically or automatically controlled by the computing system 126. For instance, the computing system 126 may be communicatively coupled to the sensors 102 via a communicative link 128. As such, the computing system 126 may be configured to receive data from the sensors 102 that is indicative of the soil moisture content of a portion(s) of the field positioned forward of the agricultural implement 12 (and, more specifically, the disk blades 50 of the agricultural implement 12). Furthermore, the computing system 126 may be communicatively coupled to the flow control device(s) 112 via a communicative link 130. In this respect, the computing system 126 may be configured to control the operation of the flow control device(s) 112 to adjust the magnitude(s) of the electric field(s) being induced on the outer surface(s) 78 of the disk blade(s) 50. In addition, the computing system 126 may be communicatively coupled to any other suitable components of the work vehicle 10, the agricultural implement 12, and/or the system 100.

In general, the computing system 126 may comprise one or more processor-based devices, such as a given controller or computing device or any suitable combination of controllers or computing devices. Thus, in several embodiments, the computing system 126 may include one or more processor(s) 132 and associated memory device(s) 134 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 134 of the computing system 126 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 134 may generally be configured to store suitable computer-readable instructions that, when implemented by the processor(s) 132, configure the computing system 126 to perform various computer-implemented functions, such as one or more aspects of the methods and algorithms that will be described herein. In addition, the computing system 126 may also include various other suitable components, such as a communications circuit or module, one or more input/output channels, a data/control bus and/or the like.

The various functions of the computing system 126 may be performed by a single processor-based device or may be distributed across any number of processor-based devices, in which instance such devices may be considered to form part of the computing system 126. For instance, the functions of the computing system 126 may be distributed across multiple application-specific controllers or computing devices, such as a navigation controller, an engine controller, a transmission controller, an implement controller, and/or the like.

Figure 5:
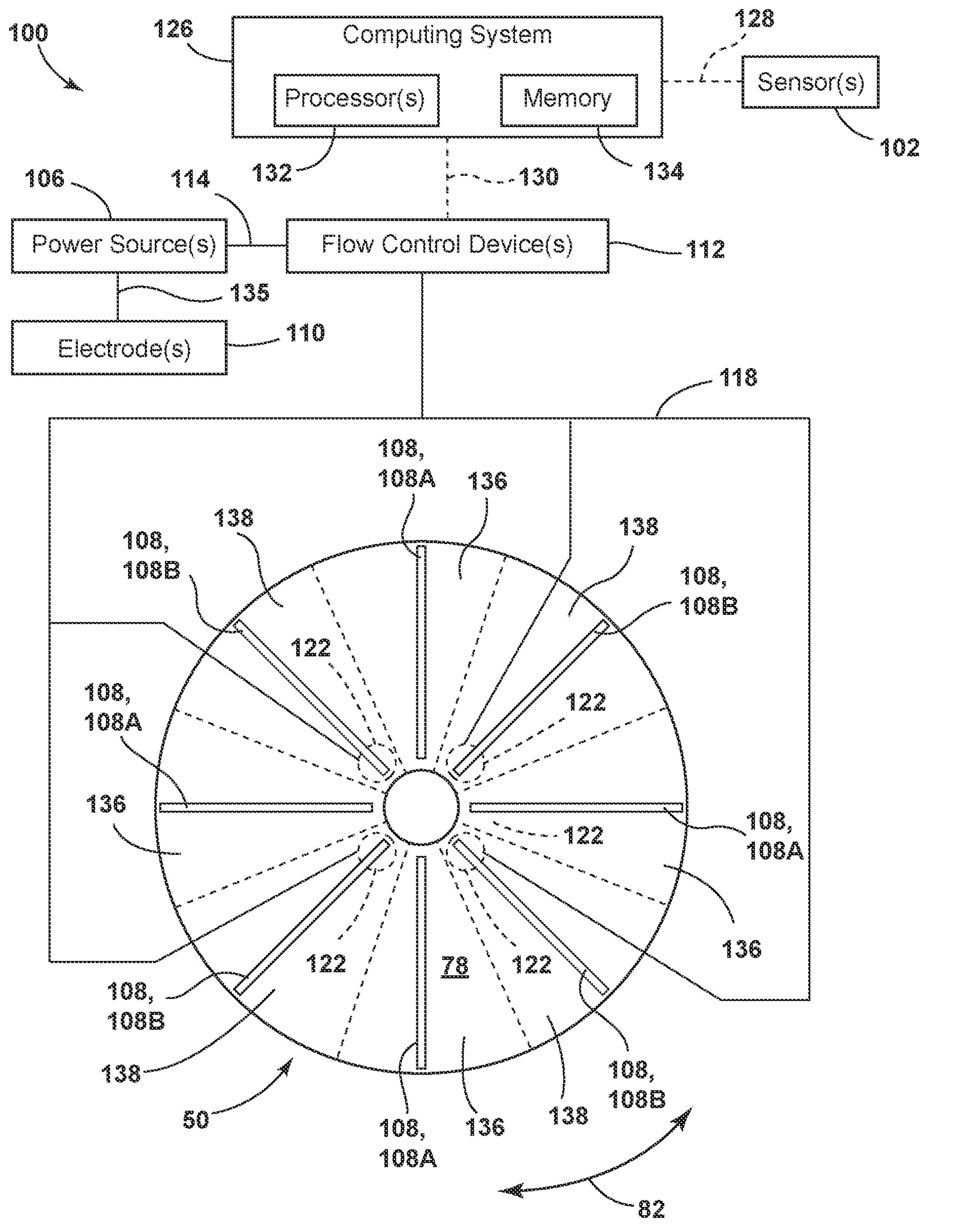
FIG. 5 illustrates a schematic view of another embodiment of a system for reducing or preventing plugging of an agricultural implement in accordance with aspects of the present subject matter.

Referring now to FIG. 5, a schematic view of another embodiment of a system 100 for reducing or preventing plugging of an agricultural implement is illustrated in accordance with aspects of the present subject matter. In general, the system 100 will be described herein with reference to the work vehicle 10 and the agricultural implement 12 described above with reference to FIGS. 1-3. However, it should be appreciated by those of ordinary skill in the art that the disclosed system 100 may generally be utilized with work vehicles having any other suitable vehicle configuration and/or agricultural implements having any other suitable implement configuration.

In general, the embodiment of the system 100 shown in FIG. 5 is similar to the embodiment of the system 100 shown in FIG. 4. For example, like the system 100 shown in FIG. 5, the system 100 shown in FIG. 5 includes the power source(s) 106, the first electrode(s) 108, the second electrode(s) 110, the flow control device(s) 112, the electric wire(s) 114, the electric wire(s) 118, the first contact(s) 122, and the computing system 126.

However, unlike the system 100 of FIG. 4, in the system 100 shown in FIG. 5, the second electrode(s) 110 is positioned remote from the disk blade(s) 50 (e.g., not embedded in the disk blade(s) 50). Moreover, the second electrode(s) 110 are electrically coupled to the power source(s) 106 via an electrical wire(s) 135. In such an embodiment, during operation of the agricultural implement 12, the second electrode(s) 110 is generally in contact with the soil within the field. As such, in some embodiments, a ground-engaging tool(s) other than the disk blades 50 may correspond to the second electrode(s) 110. For example, in one such embodiment, one or more of the ground-engaging shanks 46 may correspond to the second electrode(s) 110. However, in alternative embodiments, the second electrode(s) 110 may be configured in any suitable manner.

Additionally, unlike the system 100 of FIG. 4, the system 100 shown in FIG. 5 does not include the electrical wire(s) 120 or the second contact(s) 124. Instead, the system 100 of FIG. 5 includes less contacts 120 than first electrodes 108. For example, in the illustrated embodiment, the system 100 includes half as many contacts 122 as first electrodes 108. For example, the illustrated disk blade 50 includes eight first electrodes 108, while the system 100 only includes four contacts 122. However, in alternative embodiments, the system 100 may include any other suitable number first electrodes 108 and/or first contacts 122.

The rotation of the disk blade(s) 50 allows for the alternating inducement electric fields on the disk blade(s) 50. More specifically, as the agricultural implement 12 travels across the field, each disk blade 50 rotates relative to the corresponding disk gang shaft 56 and the soil within the field. In this respect, during a given period of time, the first contacts 122 slidingly engages a first set of the first electrodes 108A, while a second set of the first electrodes 108B are electrically isolated from the power source(s) 106. During such a period of time, the first set of first electrodes 108A may act as anodes and the second electrode(s) 110 may act as a cathode(s). In such instances, the power source(s) 106 may cause electric current to flow from first set of the first electrodes 108A to the second electrode(s) 110, thereby inducing a positive electric field in portions 136 of the outer surface(s) 78 of the disk blade(s) 50 adjacent to the first set of first electrodes 108A. Since the second set of first electrodes 108B is electrically isolated from the power source(s) 106, no electric field is induced in portions 138 of the outer surface(s) 78 of the disk blade(s) 50 adjacent to the second set of first electrodes 108B. During a subsequent period of time, the disk blade(s) 50 rotates such that the first contact(s) 122 slidingly engages the second set of the first electrodes 108B, while the first set of the first electrodes 108A are electrically isolated from the power source(s) 106. During such a period of time, the second set of first electrodes 108B may act as anodes and the second electrode(s) 110 may act as a cathode(s). In such instances, the power source(s) 106 may cause electric current to flow from second set of the first electrodes 108B to the second electrode(s) 110, thereby inducing a positive electric field in the portions 138 of the outer surface(s) 78 of the disk blade(s) 50 adjacent to the second set of first electrodes 108B. Since the first set of first electrodes 108A is electrically isolated from the power source(s) 106, no electric field is induced in portions 136 of the outer surface(s) 78 of the disk blade(s) 50 adjacent to the first set of first electrodes 108A. During another subsequent period of time, the disk blade(s) 50 rotates such that the first contact(s) 122 slidingly engages the first electrode(s) 108 and the second set of the first electrodes 108B are electrically isolated from the power source(s) 106 again and so on.

Figure 6:
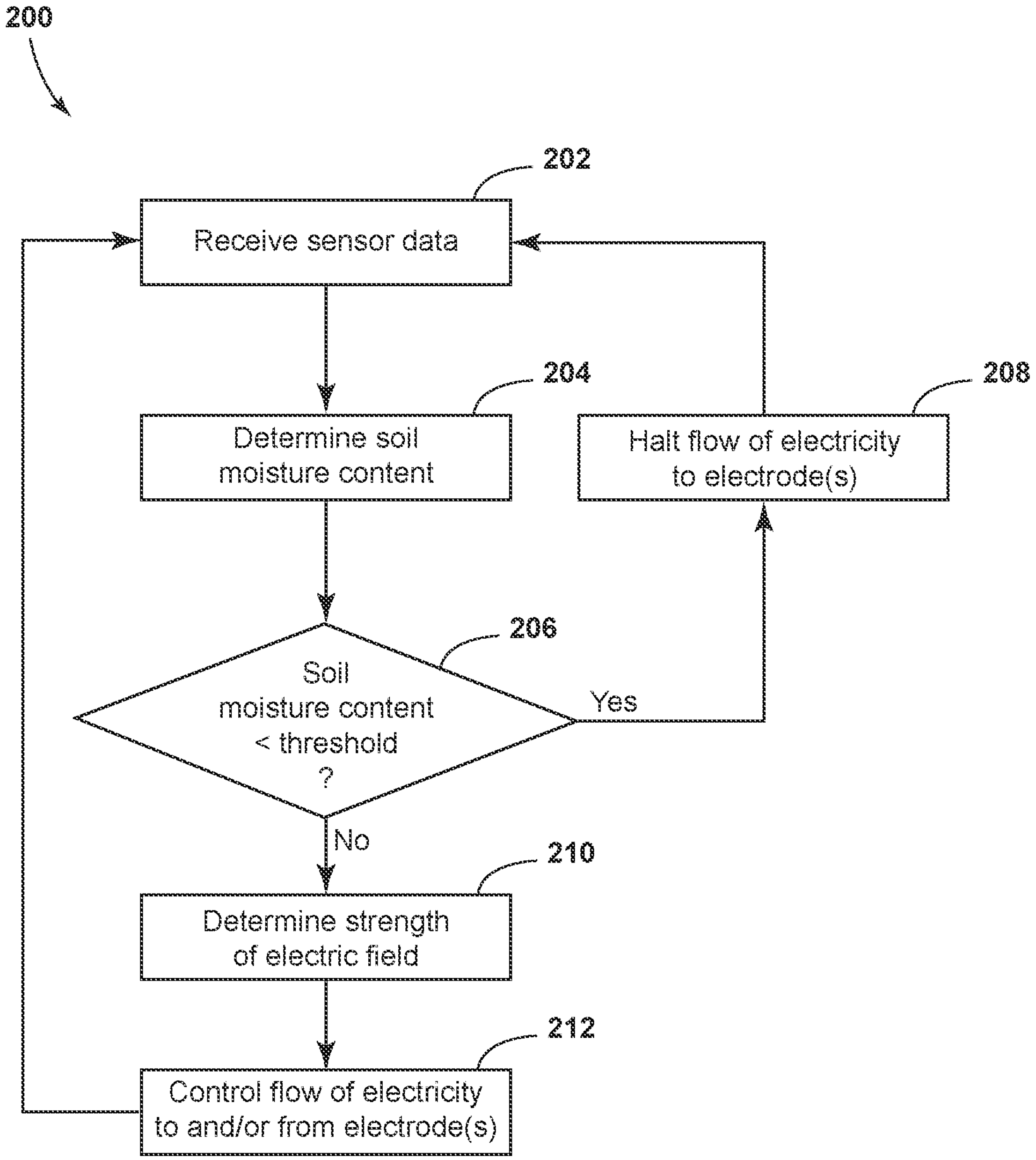
FIG. 6 illustrates a flow diagram providing one embodiment of control logic for reducing or preventing plugging of an agricultural implement in accordance with aspects of the present subject matter.

Referring now to FIG. 6, a flow diagram of one embodiment of example control logic 200 that may be executed by the computing system 126 (or any other suitable computing system) for reducing or preventing plugging of an agricultural implement is illustrated in accordance with aspects of the present subject matter. Specifically, the control logic 200 shown in FIG. 6 is representative of steps of one embodiment of an algorithm that can be executed to reduce or prevent plugging of an agricultural implement without requiring substantial computing resources and/or processing time. However, in other embodiments, the control logic 200 may be used in association with any other suitable system, application, and/or the like for reducing or preventing plugging of an agricultural implement.

As shown, at (202), the control logic 200 includes receiving sensor data indicative of the soil moisture content of a portion of a field. Specifically, as mentioned above, in several embodiments, the computing system 126 may be communicatively coupled to the sensor(s) 102 via the communicative link 128. In this respect, as the vehicle/implement 10/12 travels across the field to perform an agricultural (e.g., tillage) operation thereon, the computing system 126 may receive data from the sensor(s) 102. Such data may, in turn, be indicative of the soil moisture content of one or more portions of the field forward of the agricultural implement 12 (and, more specifically, forward of the disk blades 50).

Furthermore, at (204), the control logic 200 includes determining the soil moisture content of the field based on the received sensor data. Specifically, in several embodiments, the computing system 126 may be configured to analyze the sensor data received at (202) to determine the soil moisture content of the portion(s) of the field forward of the agricultural implement 12. For example, in one embodiment, the determined soil moisture content determined at (206) may correspond to a volumetric soil moisture content value for the section(s) of the field positioned within the field(s) of view 106 of the sensor(s) 102, such as at the working depth of the disk blade(s) 50. In this respect, the computing system 126 may use one or more look-up tables, mathematical formulas, and/or algorithms stored within its memory device(s) 134 to correlate the received sensor data to corresponding soil moisture content values. As will be described below, the determined soil moisture content is used to control the flow of electricity to and/or from the first electrode(s) 108 and/or the second electrode(s) 110 such that an electric field(s) is induced on at least a portion of the outer surface(s) 78 of the disk blade(s) 50, thereby preventing or reducing the likelihood of plugging.

Additionally, at (206), the control logic 200 includes comparing the determined soil moisture content to a predetermined threshold value. Specifically, in several embodiments, the computing system 126 may be configured to compare the soil moisture content determined at (204) to a predetermined threshold value. When the determined soil moisture content falls below the predetermined threshold value, the soil moisture content may be sufficiently low such that the use of electric fields may be ineffective or inefficient at reducing or preventing plugging. In such instances, the control logic 200 proceeds to (208). Conversely, when the determined soil moisture content is equal to or exceeds the predetermined threshold value, the soil moisture content may be sufficiently high such that the use of electric fields may be an effective and efficient mechanism to reduce or prevent plugging. In such instances, the control logic 200 proceeds to (210).

Moreover, at (208), the control logic 200 includes halting the flow of electricity to and/or from the electrode such that the electric field is not induced on at least the portion of the surface of the disk blade. Specifically, as mentioned above, in several embodiments, the computing system 126 may be communicatively coupled to the flow control device(s) 112 via the communicative link 130. In this respect, when it is determined at (206) that the determined soil moisture content falls below the predetermined threshold value, the computing system 126 may transmit control signals to the flow control device(s) 112 via the communicative link 130. Such control signals may, in turn, instruct the flow control device(s) 112 to prevent the flow of electricity between the first and second electrode(s) 108, 110. This, in turn, prevent an electric field(s) from being induced on the outer surface(s) 78 of the disk blade(s) 50. Upon completion of (208), the control logic 200 returns to (202).

Conversely, at (210), the control logic 200 includes determining the strength of the electric field to be induced on the disk blade based on the determined soil moisture content. In general, the strength of the electric field that is sufficient to facilitate electroosmosis on the outer surface(s) 78 of the disk blade(s) 50 varies with soil moisture content. Specifically, higher soil moisture content values require greater electric field magnitudes to prevent or reducing plugging than lower soil moisture contents. As such, in several embodiments, the computing system 126 may be configured to determine the strength of the electric field(s) to be induced on the portion(s) of the disk blade(s) 50 (e.g., the first portions 76 and/or the second portions 80) based on the soil moisture content determined at (206). For example, the computing system 126 may use one or more look-up tables, mathematical formulas, and/or algorithms stored within its memory device(s) 134 to correlate the soil moisture content values to corresponding electric field strengths.

In addition, at (212), the control logic 200 includes controlling the flow of electricity such that the electric field induced on the at least the portion of the surface of the disk blade has the determined strength. Specifically, in several embodiments, the computing system 126 may be configured to control the operation of the flow control device(s) 112 to control the flow of electricity to and/or from the first electrode(s) 108 and/or the second electrode(s) 110 such that the electric field(s) induced on the portion(s) of the outer surface(s) 78 of the disk blade(s) 50 has the strength determined at (210). This, in turn, ensures that the electric field(s) induced on the portion(s) of the outer surface(s) 78 of the disk blade(s) 50 is sufficient to reduce or prevent plugging of the disk blade(s). For example, the computing system 126 may transmit control signals to the flow control device(s) 112 via the communicative link 130. Such control signals may, in turn, instruct the flow control device(s) 112 to adjust the flow of electricity between the first and second electrode(s) 108, 110 such that the electric field(s) induced on the outer surface(s) 78 of the disk blade(s) 50 is of the determined strength. Upon completion of (212), the control logic 200 returns to (202).

Figure 7:
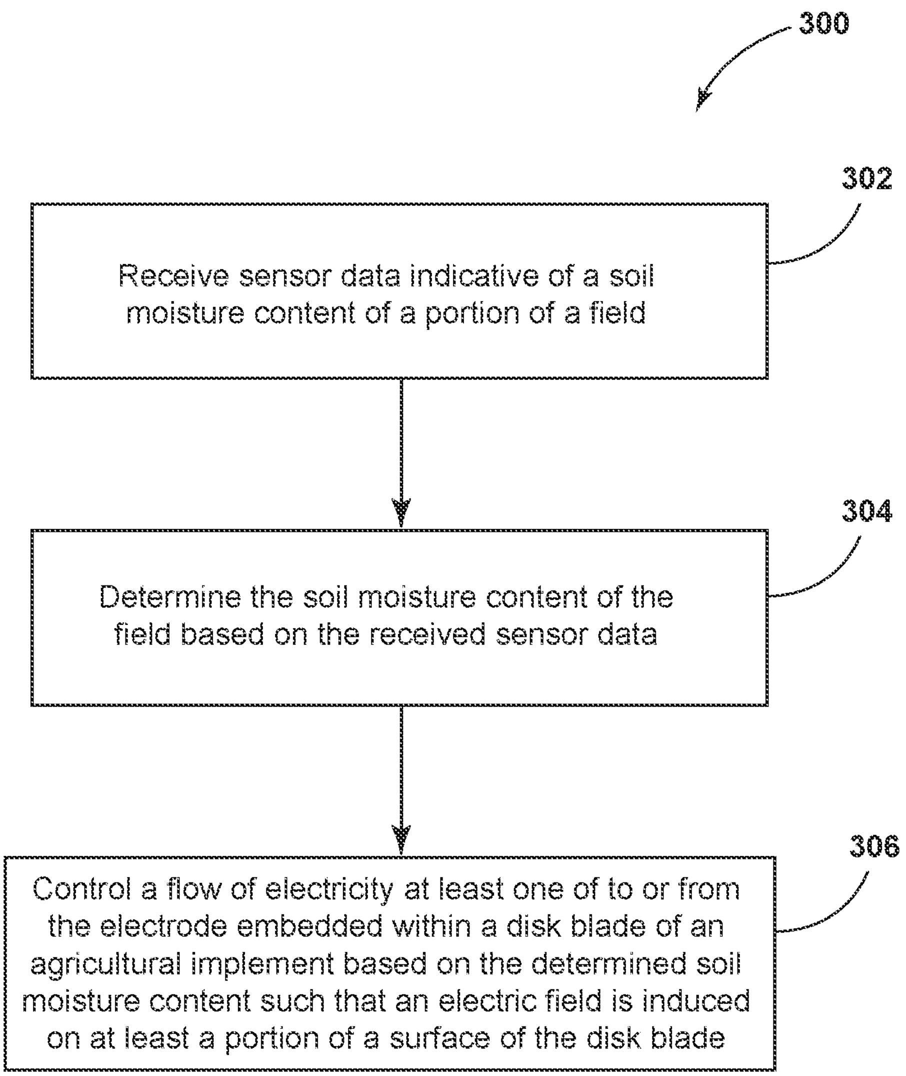
FIG. 7 illustrates a flow diagram of one embodiment of a method for reducing or preventing plugging of an agricultural implement in accordance with aspects of the present subject matter.

Referring now to FIG. 7, a flow diagram of one embodiment of a method 300 for reducing or preventing plugging of an agricultural implement is illustrated in accordance with aspects of the present subject matter. In general, the method 300 will be described herein with reference to the work vehicle 10, the agricultural implement 12, and the system 100 described above with reference to FIGS. 1-6. However, it should be appreciated by those of ordinary skill in the art that the disclosed method 300 may generally be implemented with any work vehicle having any suitable vehicle configuration, with any agricultural implement having any suitable implement configuration, and/or within any system having any suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (302), the method 300 includes receiving, with a computing system, sensor data indicative of a soil moisture content of a portion of a field. For instance, as described above, the computing system 126 may be configured to receive data from the sensor(s) 102 as the vehicle/implement 10/12 travels across the field (e.g., to perform an agricultural operation thereon). Such sensor data is, in turn, indicative of the soil moisture content of a portion(s) of the field positioned forward of the agricultural implement 12.

Furthermore, at (304), the method 300 includes determining, with the computing system, the soil moisture content of the field based on the received sensor data. For instance, as described above, the computing system 126 may be configured to determine the soil moisture content of the field based on the received sensor data.

Additionally, at (306), the method 300 includes controlling, with the computing system, the flow of electricity at least one of to or from an electrode embedded within a disk blade of an agricultural implement based on the determined soil moisture content such that an electric field is induced on at least a portion of a surface of the disk blade. For instance, as described above, the computing system 126 may be configured to control the operation of the flow control device(s) 112 to control the flow of electricity to and/or from the first electrode(s) 108 and/or the second electrode(s) 112 based on the determined soil moisture content such that an electric field(s) is induced on at least a portion of the outer surface(s) 78 of the disk blade(s) 50 (e.g., of a sufficient strength to facilitate electroosmosis and the associated reduction/prevention of plugging).

It is to be understood that the steps of the control logic 200 and the method 300 are performed by the computing system 126 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 126 described herein, such as the control logic 200 and the method 300, is implemented in software code or instructions which are tangibly stored on a tangible computer readable medium. The computing system 126 loads the software code or instructions via a direct interface with the computer readable medium or via a wired and/or wireless network. Upon loading and executing such software code or instructions by the computing system 126, the computing system 126 may perform any of the functionality of the computing system 126 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural implement, comprising:
- a frame;
- a disk blade supported on the frame, the disk blade configured to rotate relative to soil within a field as the agricultural implement travels across the field;
- an electrode embedded within the disk blade;
- a sensor configured to generate data indicative of a soil moisture content of a portion of the field; and
- a computing system communicatively coupled to the sensor, wherein the computing system:
  - determines the soil moisture content of the field based on the data generated by the sensor;
  - determines a strength of an electric field to be induced on at least a portion of a surface of the disk blade based on the determined soil moisture content; and
  - controls a flow of electricity at least one of to or from the electrode based on the determined soil moisture content such that the electric field is induced on the at least a portion of the surface of the disk blade with the determined strength.

2. The agricultural implement of claim 1, wherein, when controlling the flow of electricity, the computing system:
- compares the determined soil moisture content to a predetermined threshold value; and
- when the determined soil moisture content falls below the predetermined threshold value, halts the flow of electricity at least one of to or from the electrode such that the electric field is not induced on the at least the portion of the surface of the disk blade.

3. The agricultural implement of claim 1, wherein the sensor has a field of view directed at a section of the field positioned forward of the agricultural implement relative to a direction of travel of the agricultural implement.

4. The agricultural implement of claim 3, wherein, when determining the soil moisture content of the field, the computing system determines a volumetric soil moisture content value for the section of the field positioned within the field of view of the sensor.

5. A system for reducing or preventing plugging of an agricultural implement, the system comprising:
- a disk blade configured to rotate relative to soil within a field as the agricultural implement travels across the field;
- an electrode embedded within the disk blade;
- a sensor configured to generate data indicative of a soil moisture content of a portion of the field; and
- a computing system communicatively coupled to the sensor, wherein the computing system:
  - determines the soil moisture content of the field based on the data generated by the sensor;
  - determines a strength of an electric field to be induced on at least a portion of a surface of the disk blade based on the determined soil moisture content; and
  - controls a flow of electricity at least one of to or from the electrode based on the determined soil moisture content such that the electric field is induced on the at least a portion of the surface of the disk blade with the determined strength.

6. The system of claim 5, wherein, when controlling the flow of electricity, the computing system:

compares the determined soil moisture content to a predetermined threshold value; and when the determined soil moisture content falls below the predetermined threshold value, halts the flow of electricity at least one of to or from the electrode such that the electric field is not induced on the at least the portion of the surface of the disk blade.

7. The system of claim 5, wherein the sensor has a field of view directed at a section of the field positioned forward of the agricultural implement relative to a direction of travel of the agricultural implement.

8. The system of claim 7, wherein, when determining the soil moisture content of the field, the computing system determines a volumetric soil moisture content value for the section of the field positioned within the field of view of the sensor.

9. The system of claim 8, wherein, when determining the soil moisture content of the field, the computing system determines the volumetric soil moisture content value for the section of the field positioned within the field of view of the sensor at a working depth of the disk blade.

10. The system of claim 7, wherein the sensor is mounted on the agricultural implement.

11. The system of claim 7, wherein the sensor is mounted on a work vehicle configured to tow the agricultural implement across the field.

12. The system of claim 5, wherein the electrode corresponds to a first electrode, the system further comprising:

a second electrode embedded within the disk blade, the second electrode being spaced apart from the first electrode along a circumferential direction of the disk blade.

13. The system of claim 12, wherein:

the electric field induced on at least the portion of the surface of the disk blade corresponds to a first electric field induced on a first portion of the surface of the disk blade; and the computing system controls a flow of electricity at least one of to or from the second electrode based on the determined soil moisture content such that a second electric field is induced on a second portion of the surface of the disk blade, the second portion of the disk blade being spaced apart from the first portion of the disk blade in the circumferential direction.

14. The system of claim 13, wherein the first electric field is one of a positive electric field or a negative electric field and the second electric field is the other of the positive electric field or the negative electric field.

15. The system of claim 5, wherein the electrode corresponds to a first electrode, the system further comprising:

a second electrode positioned remote from the disk blade.

16. A method for reducing or preventing plugging of an agricultural implement, the agricultural implement including a disk blade configured to rotate relative to soil within a field as the agricultural implement travels across the field, the agricultural implement further including an electrode embedded within the disk blade, the method comprising:

receiving, with a computing system, sensor data indicative of a soil moisture content of a portion of the field;

determining, with the computing system, the soil moisture content of the field based on the received sensor data;

determining, with the computing system, a strength of an electric field to be induced on at least a portion of a surface of the disk blade based on the determined soil moisture content; and controlling, with the computing system, a flow of electricity at least one of to or from the electrode based on the determined soil moisture content such that the electric field is induced on at least a portion of the surface of the disk blade with the determined strength.

17. The method of claim 16, wherein controlling the flow of electricity comprises:

comparing, with the computing system, the determined soil moisture content to a predetermined threshold value; and when the determined soil moisture content falls below the predetermined threshold value, halting, with the computing system, the flow of electricity at least one of to or from the electrode such that the electric field is not induced on the at least the portion of the surface of the disk blade.

* * * * *